United States Patent [19]
Koniecka

[11] Patent Number: 4,721,183
[45] Date of Patent: Jan. 26, 1988

[54] TREE SEAT

[76] Inventor: Edmund T. Koniecka, 2621 - 10th St. S., Wisconsin Rapids, Wis. 54494

[21] Appl. No.: 37,426

[22] Filed: Apr. 13, 1987

[51] Int. Cl.⁴ .................. A45F 3/26; A01M 31/02
[52] U.S. Cl. ........................... 182/182; 108/152
[58] Field of Search ............... 182/187, 188; 108/152

[56] References Cited

U.S. PATENT DOCUMENTS

| | | | |
|---|---|---|---|
| 2,074,586 | 3/1937 | Heinrich | 182/187 |
| 2,855,980 | 10/1958 | Konieczka | 182/187 |
| 3,115,213 | 12/1963 | Cloutier | 182/187 |
| 3,353,629 | 11/1967 | Brunes | 182/187 |
| 3,493,080 | 2/1970 | Ehlert | 182/187 |
| 4,113,058 | 9/1978 | Kobosh | 182/187 |

*Primary Examiner*—Reinaldo P. Machado
*Attorney, Agent, or Firm*—Fuller, Puerner & Hohenfeldt, S.C.

[57] ABSTRACT

A portable tree seat has a main bracket, a seat portion pivotally connected to the main bracket, and a support brace for supporting the seat portion in an unfolded operative configuration wherein it is in a generally horizontal attitude. The support brace includes a positive stop and a spring that cooperate to automatically locate the support brace in a position for engaging the main bracket when the tree seat is unfolded. The tree seat further includes a rod so located on the seat portion that a rope tied thereto is tightened to maximum tension on the vertical support when the seat portion is lowered from a raised position to the unfolded operative configuration.

7 Claims, 4 Drawing Figures

U.S. Patent  Jan. 26, 1988  4,721,183
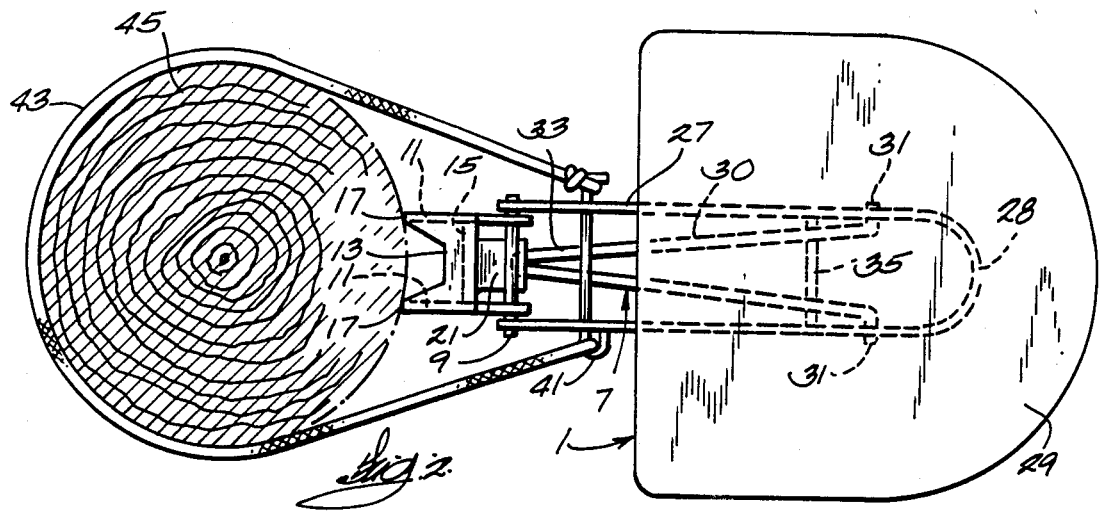
Fig. 2.
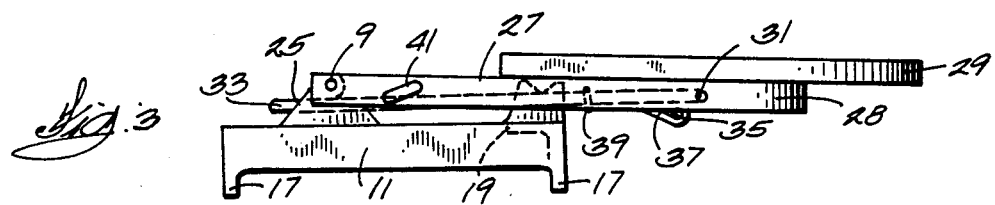
Fig. 3.
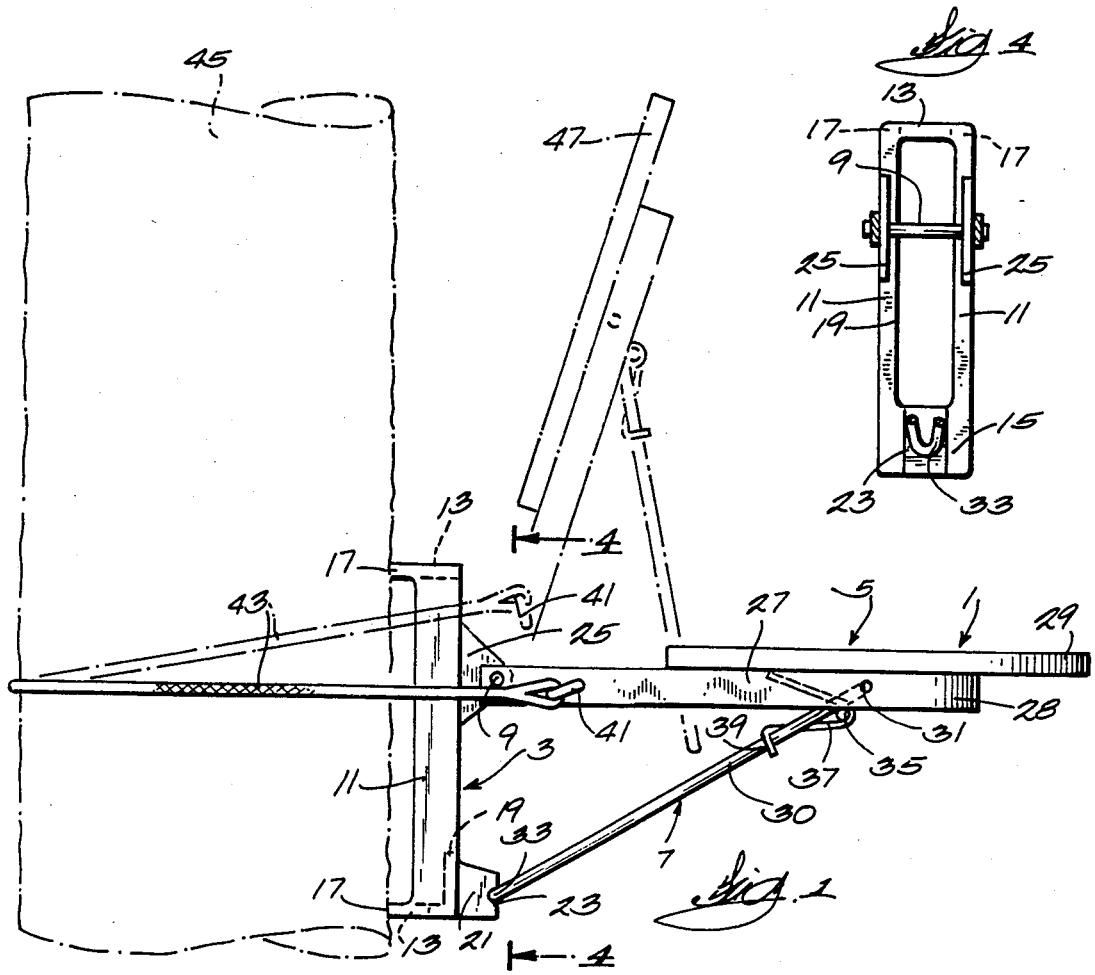
Fig. 4.
Fig. 1.

TREE SEAT

BACKGROUND OF THE INVENTION

1. Field of the Invention.

This invention pertains to seating apparatus, and more particularly to portable seats.

2. Description of the Prior Art.

Various equipment has been developed to enable outdoorsmen to sit at selected locations in the field. Such equipment includes portable seats that utilize a tree or post as a vertical support.

An example of portable seating may be seen in U.S. Pat. No. 2,855,980, wherein a foldable seat is held in place by a chain wrapped around a tree. The seat of the U.S. Pat. No. 2,855,980 has enjoyed some success, but it does not possess all of the advantages of the present invention. The points of chain attachment on the seat of the U.S. Pat. No. 2,855,980 are located so as to leave slack in the chain when the seat is in the operative configuration. Further, the angular brace that supports the seat portion in the horizontal attitude must be manually positioned into place each time the seat is unfolded.

U.S. Pat. No. 4,113,058 discloses a portable seat to which a mounting chain is attached in a manner that prevents any tightening of the chain after the seat is located on the support tree or post. Another deficiency is that the supporting brace is awkward to maneuver into a support position with the vertical main body when the seat member is pivoted to the unfolded configuration.

Thus, a need exists for improved outdoor seating.

SUMMARY OF THE INVENTION

In accordance with the present invention, an inexpensive and comfortable tree seat is provided that is more convenient to operate than was previously available. This is accomplished by apparatus that includes a support brace that automatically locates a seat portion in the proper attitude relative to a main bracket when the tree seat is unfolded.

The seat portion is pivotally connected near the upper end of the main bracket. The seat portion and main bracket are pivotable between a folded inoperative configuration wherein their planes are substantially parallel, and an unfolded operative configuration wherein the seat portion is at approximately right angles to the main bracket. To maintain the seat portion in the unfolded operative configuration, the support brace has a first end pivotally connected to the seat portion. The free end of the support brace is adapted to engage a notch in the lower end of the main bracket. The support brace, main bracket, and seat portion are designed to nest neatly within each other in the folded configuration, thereby reducing the folded size and increasing the convenience and portability of the tree seat.

In the preferred embodiment, the support brace is automatically located at the correct position for engaging the main bracket notch when the seat portion is pivoted from the inoperative folded configuration to the operative unfolded configuration. For that purpose, the support brace is resiliently biased to an open position with respect to the seat portion. The open position is defined by a positive stop built into the seat portion. In the folded configuration, the spring force is overcome to permit the support brace to nest between the main bracket and seat portion. Upon unfolding the tree seat, the spring and positive stop cooperate to automatically locate the support brace for proper engagement with the main bracket notch.

Further in accordance with the present invention, the tree seat is designed to be held against the vertical support with maximum tension in a holding rope or chain. To achieve that result, a rod is inserted through the seat portion in a location so as to be approximately in a horizontal line with the pivot point between the seat portion and main bracket when the tree seat is in the operative configuration, with the rod being between the seat portion free end and the pivot point. One end of the rope is tied to the rod, the main bracket is placed against the tree or other vertical support, and the rope is wrapped around the tree. The seat portion is raised to a position above horizontal, and the second end of the rope is attached to the rod. Upon lowering the seat portion, the support brace automatically engages the main bracket notch to support the seat portion in a horizontal attitude, and any slack in the rope is taken up. The tree seat is thereby mounted to the tree with maximum rope tension.

Other aims and advantages of the invention will become apparent to those skilled in the art upon reading the disclosure.

BRIEF DESCRIPTION OF THE DRAWINGS

FIG. 1 is a side view of the tree seat of the present invention shown in the unfolded operative configuration in place on a tree;

FIG. 2 is a top view of the tree seat in the unfolded operative configuration;

FIG. 3 is a side view of the tree seat showing it in the folded inoperative configuration; and FIG. 4 is a cross-sectional view taken along lines 4—4 of FIG. 1.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1-4, a tree seat 1 is illustrated that includes the present invention. The tree seat is particularly useful to outdoorsmen for providing a conveniently portable resting place, but it will be understood that the invention is not limited to out of doors applications.

The tree seat 1 comprises a a: bracket 3, a seat portion 5, and a support brace 7. The a: bracket 3 may be in the form of a hollow generally rectangular body have opposite side walls 11 and end walls 13 joined to a partial top plate 15. The central portions of the free ends of the end walls 13 are indented so as to form four feet 17. The interior of the plate 15 is fabricated with a cutout 19. Upstanding from a first end of the main bracket is a pedestal 21 that is formed with a notch 23. Near the main bracket second end are a pair of transversely spaced upstanding lugs 25.

The seat portion 5 is composed of a generally U-shaped bracket 27. The loop end 28 of the bracket 27 supports a comfortable seat 29, which may be fabricated from conventional materials. The seat 29 may be attached to the bracket 27 by any suitable means. The seat portion is pivotally connected to the main bracket 3 near the second end thereof by means of a pin 9 that extends through the main bracket lugs 25 and aligned holes in the free ends of the support bracket 27.

The seat portion 5 is maintained in the unfolded operative configuration of FIGS. 1 and 2, in which it is in a plane generally perpendicular to the plane of the main bracket 3, by the support brace 7. As best shown in FIG. 2, the support brace 7 comprises a generally V-shaped strut 30 having out-turned free ends 31. The strut ends 31 are pivotally received within holes in the bracket 27 near the bracket loop end 28. The strut 30 is dimensioned such that when the narrow end 33 thereof is received within the main bracket notch 23, the plane of the seat 29 is at substantially right angles to the plane of the main bracket 3.

It is a feature of the present invention that the strut 30 is automatically set at the proper position relative to the seat portion 5 for engaging the main bracket notch 23 when the tree seat 1 is unfolded from the folded inoperative configuration of FIG. 3. For that purpose, the support brace 7 includes a pin 35 welded or otherwise secured to the bracket 27 in such a location as to limit the pivotal movement of the strut in the counterclockwise direction as viewed in FIG. 1. To locate the strut against the pin 35, a torsion spring 37 is wrapped around the pin. The spring 37 has a leg 39 bent over the strut so as to bias it to the open attitude against the pin.

Further in accordance with the present invention, the tree seat 1 is retained in place on a vertical support, such as a tree 45, with maximum tightness and safety. For that purpose a hooked rod 41 is mounted to and protrudes through both legs of the bracket 27 near the pin 9. One end of a rope, chain, or cable 43 is permanently tied to one end of the protruding rod 41. To mount the tree seat to the tree or post 45, the feet 17 of the main bracket 3 are placed against the tree. The seat portion 5 is swung upwardly above the horizontal, as indicated by the phantom lines 47 in FIG. 1. The second end of the rope 43 is tied to the second end of the rod 41, leaving a small amount of slack in the rope. With the seat portion in the upraised configuration of FIG. 1, the support brace 7 is in the open position, being held there by the cooperation of the spring 37 and pin 35. The user then pivots the seat portion in a clockwise direction with respect to FIG. 1 until the support brace free end 33 enters and is supported by the main bracket notch 23. Simultaneously, the arcuate motion of the rod 41 about the pin 9 causes the rope to be tightened about the tree, so that maximum tightness is attained when the seat portion is in the horizontal operative configuration. To remove the tree seat from the tree 45, the seat portion is merely lifted to the position of the phantom lines 47 in FIG. 1, thereby creating slack in the rope. One end of the rope is then untied from the rod 41.

Referring especially to FIG. 3, the tree seat 1 is foldable into a neat and compact package. To accomplish folding, the seat portion 5 is pivoted to an obtuse angle relative to the main bracket 3 until the support brace free end 33 becomes disengaged from the main bracket notch 23. The strut 30 is then pivoted clockwise with respect to FIG. 3 about the legs 31 against the force of the spring 37 until the strut lies inside the bracket 27. Pivoting the strut about the legs 31 causes the strut free end 33 to pass through the main bracket cutout 19. The main bracket is then pivoted about pin 9 until its plane is generally parallel to that of the support brace and seat portion.

It will be noticed in FIG. 3 that the support brace free end 33 lies on the opposite side of the pin 9 as do the strut legs 31. Consequently, in the folded inoperative configuration, the main bracket and support brace are in an over-center condition with the strut free end bearing against the main bracket so as to retain it in the folded configuration. In addition, the V-shape of the strut causes a wedging action within the bracket cutout 19, which aids to retain the tree seat 1 in the folded configuration of FIG. 3. Consequently, the tree seat remains folded until the main bracket first end is intentionally manually pivoted to a plane perpendicular to the seat portion. Upon manually pivoting the main bracket about the pin 9, the support brace free end 33 becomes disengaged from the main bracket cutout 19. The spring 37 and positive stop 35 then cooperate to automatically set the support brace to the position wherein the support brace free end is engagable with the main bracket notch 23.

Thus, it is apparent that there has been provided, in accordance with the invention, a tree seat that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A tree seat comprising:
   a. bracket means for bearing against a vertical support, the bracket means having a notch at a first end and a central cutout;
   b. seat means pivotally attached to the bracket means at a second end thereof for pivoting between an unfolded operative configuration wherein the plane of the seat means is generally perpendicular to the plane of the bracket means and a folded inoperative configuration wherein the plane of the seat means is generally parallel to the plane of the bracket means;
   c. a generally V-shaped support brace having a first end pivotally mounted to the seat means and a free end, the support brace being pivotable between a closed position wherein it is generally parallel to the seat means and an open position wherein it makes an angle with the seat means;
   d. a spring mounted to the seat means for biasing the support brace to the open position; and
   e. a pin secured to the seat means for defining the open position of the support brace at an angle whereby the support brace free end is automatically engagable with the bracket means notch to support the seat means when the seat means is pivoted to the unfolded operative configuration.

2. The tree seat of claim 1 wherein:
   a. the bracket means, seat means, and support brace lie in parallel planes and are nested within each other when in the folded inoperative configuration with the support brace free end and the bracket means being in an over-center condition; and
   b. the spring urges the support brace free end against the main bracket central cutout in a wedging action to maintain the tree seat in the folded configuration.

3. A portable tree seat for use with a vertical support comprising:
   a. a main bracket for bearing against the vertical support and having first and second ends;
   b. a generally planar seat portion having first and second ends;
   c. pin means for pivotally connecting the seat portion first end to the main bracket first end to permit pivoting the seat portion between a first configuration wherein the seat portion and the main bracket lie in generally parallel planes and a second configuration wherein the seat portion makes an obtuse angle with the main bracket;
   d. brace means for engaging the main bracket second end to support the seat portion in an unfolded operative configuration wherein the plane of the seat portion is approximately perpendicular to the plane of the main bracket;
   e. a rod secured to the seat portion near the first end thereof and located between the pin means and the seat portion second end; and
   f. a rope wrapped around the vertical support and having the ends thereof tied to the rod when the seat poriton is in the second configuration,
   so that when the seat portion is pivoted from the second configuration to the unfolded operative configuration the rod swings in an arcuate path to tighten the slack in the rope and thereby hold the tree seat with maximum tension against the vertical support and further comprising:
   g. a spring mounted to the seat portion for biasing the brace means to an open position relative to the plane of the seat portion; and
   h. a positive stop secured to the seat portion for setting the open position of the brace means to a position wherein the brace means engages the main bracket to support the seat portion in the unfolded operative configuration.

4. The tree seat of claim 3 wherein the spring and positive stop cooperate to automatically set the brace means to the proper position for engaging the main bracket when the seat portion is pivoted from the first configuration to the second configuration.

5. In a tree seat having a main bracket, a seat portion pivotally attached to the main bracket for pivoting between folded and unfolded configurations relative to the main bracket, and a support brace pivotally attached to the seat portion and adapted to engage the main brace for supporting the seat portion in an operative configuration wherein it lies in a plane generally perpendicular to the plane of the main bracket,
   the improvement comprising:
   a. a positive stop secured to the seat portion for locating the support brace at the proper position for engagement with the main bracket when the seat portion is in the operative configuration; and
   b. a spring for biasing the support brace against the positive stop when the seat portion is pivoted from the folded to the unfolded configuration to thereby automatically locate the support brace to the proper position for engaging the main bracket and for supporting the seat portion in the operative configuration.

6. In a portable tree seat having a main bracket adapted to bear against a vertical support, a generally planar seat portion, a pin pivotally connecting the seat portion to the main bracket for pivoting the seat portion between a first configuration wherein it and the main bracket lie in generally parallel planes and a second configuration wherein the seat portion makes an obtuse angle with the main bracket, and a support brace for supporting the seat portion on the main bracket in an unfolded operative configuration wherein the planes of the seat portion and main bracket are generally perpendicular, the main bracket, seat portion, and support brace being nestable together when in the first configuration,
   the improvement comprising:
   a. a rod inserted in the seat portion at a location between the pin and the seat portion free end; and
   b. a rope wrapped around the vertical support and tied to the rod when the seat portion is at the second configuration,
   so that slack in the rope is taken up when the seat portion is pivoted from the second configuration to the unfolded operative configuration to thereby secure the tree seat to the vertical support with maximum rope tension and wherein the improvement further comprises:
   c. a positive stop secured to the seat portion for locating the support brace at the position wherein it engages the main bracket for supporting the seat portion in the unfolded operative configuration; and
   d. a spring secured to the positive stop and cooperating therewith to automatically set the support brace to the position for engaging the main bracket when the seat portion is unfolded from the first nested configuration to the second configuration.

7. In combination with a vertical support, a portable tree seat comprising:
   a. a vertical main bracket adapted to bear against the support;
   b. a seat portion pivotally connected to the upper end of the main bracket and pivotable between a first configuration wherein it lies nested against the main bracket and a second configuration wherein it makes an obtuse angle with the main bracket;
   c. a support brace pivotally mounted to the seat portion and having a free end engagable with the lower end of the main bracket to support the seat portion in an unfolded operative configuration wherein the seat portion lies in a plane generally perpendicular to the plane of the main bracket;
   d. a spring attached to the seat portion for biasing the support brace to an open position relative to the seat portion when the seat portion is pivoted from the first to the second configurations;
   e. a positive stop secured to the seat portion for setting the proper open position of the support brace for engaging the main bracket;
   f. a rod inserted in the seat portion at a point thereon distal from the pivotal connection thereof with the main bracket; and
   g. a rope tied to the rod and wrapped around the support when the seat portion is in the second configuration,
   so that the slack in the rope is taken up and the support brace automatically engages the main bracket when the seat portion is pivoted from the second configuration to the unfolded operative configuration.

* * * * *

UNITED STATES PATENT AND TRADEMARK OFFICE
CERTIFICATE OF CORRECTION

PATENT NO. : 4,721,183
DATED : January 26, 1988
INVENTOR(S) : Edmund T. Konieczka It is certified that error appears in the above—identified patent and that said Letters Patent is hereby corrected as shown below:

On the face of the patent, item [76] Inventor:

Delete "Edmund T. Koniecka" and substitute therefor

--- Edmund T. Konieczka ---

Signed and Sealed this

Thirteenth Day of September, 1988

*Attest:*

DONALD J. QUIGG

*Attesting Officer*   *Commissioner of Patents and Trademarks*